United States Patent Office 3,328,260
Patented June 27, 1967

3,328,260
PERFUME COMPOSITIONS CONTAINING
METHOXYPHENYLETHERS
William J. Houlihan, Mountain Lakes, N.J., assignor to Universal Oil Products Company, Des Plaines, Ill., a corporation of Delaware
No Drawing. Filed Dec. 27, 1963, Ser. No. 334,000
2 Claims. (Cl. 167—94)

This invention relates to methoxyphenylethers and particularly to allyl and beta-methallyl ethers, to processes for preparing these compounds and to compositions for using the same.

This application is a continuation-in-part of my co-pending application Ser. No. 158,578, filed Dec. 11, 1961, now abandoned, entitled, "Beta-Methallyl p-Methoxyphenyl Ether."

It has been discovered that allyl and methallyl methoxyphenyl ethers have unusual and useful odors which made them of specific value to the perfume and related industries. These compounds have the following structural formula:

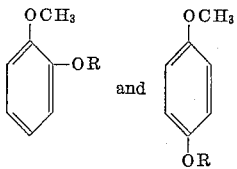

wherein R is allyl ($-CH_2CH=CH_2$) or methylallyl

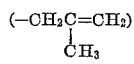

Beta-methallyl p-methoxyphenyl ether has an odor resembling that of bergamot oil. Bergamot oil is a relatively expensive oil which differs somewhat in composition and quality depending upon its source and method of production. Beta-methallyl p-methoxyphenyl ether, however, can be economically produced and is constant in its odor and composition. Naturally occurring bergamot oil often possesses certain overtones or perfume notes which are desirable in many perfumed compositions and, therefore, beta-methallyl p-methoxyphenyl ether can also be used as an additive or extender with natural bergamot oil. The other compounds of the invention in direct contrast to the beta-methallyl p-methoxyphenyl ether have fruity or phenolic type odors which make them useful in compounding a wide range of perfume compositions. It is surprising that the compounds of the invention have such characteristic odors, since compounds such as methyl anethol, which has a methallyl group in place of the allyloxy group in the para position is characterized by a very different odor which may be defined as a strong anise or licorice odor.

The compounds of the invention are prepared in good yields by reacting the corresponding methoxy phenol with an allyl halide or a beta-methallyl halide.

The reaction can be chemically represented utilizing p-hydroxyanisole as the starting material as follows:

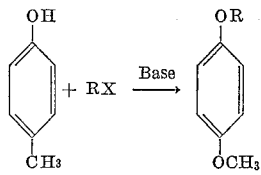

wherein X is a chloro, bromo or iodo group and R is as indicated above.

The reaction is conveniently carried out in a suitable solvent medium and in the presence of an alkaline agent. Acetone is the preferred solvent although substantially any oxygenated or hydrocarbon solvent can be utilized, as for example, methyl ethyl ketone cyclohexanone, tetrahydrofurane, dioxane, isopropyl alcohol, cyclohexanol, pentane, hexane and the like. The alkali metal carbonates are preferred as the base when carrying out the reaction, but any of the alkali metal or alkaline earth metal carbonates, hydroxides or alkanoates can be used. The reaction temperature can vary from about 20° C. to about 150° C., but the preferred temperature is about 100° C. or the reflux temperature of the reaction mixture. Similarly, the length of the reaction time can be varied from about 4 to about 12 hours although a period of 6 hours is generally preferred.

The following examples are given for purposes of illustration:

EXAMPLE I

A stirred mixture of 2 mols (248 g.) of p-hydroxyanisole, 2 mols (181 g.) of beta-methallyl chloride, 2.2 mols (304 g.) of potassium carbonate and 300 g. of acetone is refluxed for 12 hours. Water is added to the reaction mixture to dissolve the salts. The organic layer is separated from the water layer and the latter is extracted with benzene. The combined organic layers are washed with a 10% sodium hydroxide solution until phenol-free. The mixture is then distilled through a column to yield beta-methallyl p-methoxyphenylether, B.P. 104–106° C. at 1 mm.

The compound thus obtained has a strong bergamot odor and may be used by itself in perfumes or perfumed products. However, it will ordinarily be used in combination with other agents in a compounded perfume composition wherein the product of the present invention replaces part or all of the bergamot oil which would otherwise be employed. Thus, the compound is particularly useful as an extender for bergamot oil obtained from natural sources. Thus, by way of example:

EXAMPLE II

A cologne base is prepared by mixing the following components:

| | |
|---|---|
| Capraldehyde | 0.50 |
| Resin benzoin | 3.0 |
| Resin labdanum | 1.5 |
| Lavandin | 15.5 |
| Polyalkylated acetyl tetralin | 1.5 |
| Neroly | 15.0 |
| Citral diethyl acetate | 30.0 |
| Orange sweet | 5.0 |
| Rosemary | 3.0 |

Three parts of the base is mixed with one part of bergamot oil and compared with one sample wherein one-half of the bergamot oil is replaced with beta-methallyl p-methoxyphenyl ether and a second sample wherein all of the bergamot was replaced. All of the samples have approximately the same freshness of cologne.

EXAMPLE III

A stirred mixture of 248 grams of p-hydroxyanisole (2.0 mols), 242 grams of allyl bromide (2.0 mols), 304 grams of potassium carbonate (2.2 mols), and 300 grams of acetone is refluxed for eight hours. The reaction mixture is cooled to 25° C. and sufficient water is added to dissolve the salts and the aqueous layer is separated. The aqueous layer is extracted with 200 ml. of benzene and the organic phases are combined and washed twice with 100 ml. portions of an aqueous 10% solution of sodium hydroxide. The mixture is then distilled through a column to yield p-methoxyphenyl allyl ether. The compound has a fruity odor.

EXAMPLE IV

A stirred mixture of 248 grams of guaiacol (2.0 mols), 181 grams of methallyl chloride (2.0 mols), 304 grams of potassium carbonate (2.2 mols) and 200 grams of acetone is refluxed for eight hours. The resulting viscous, light brown solution is allowed to cool to 25° C. and sufficient water is added to the cooled solution to dissolve the salts. The organic layer is separated and the aqueous layer extracted with 200 ml. of benzene. The combined organic layers are washed three times with an aqueous 10% solution of sodium hydroxide. The mixture is then distilled through a column to yield o-methoxyphenyl methallyl ether. The yield was 41%. The compound has a phenolic type odor useful in producing perfumes and perfumed products.

EXAMPLE V

A stirred mixture of 248 grams of guaiacol (2.0 mols) 242 grams of allyl bromide (2.0 mols), 304 grams of potassium carbonate (2.2 mols) and 400 grams of acetone is refluxed for 2.25 hours. The reaction mixture is allowed to cool to 25° C. and sufficient water is added to dissolve the salts. The organic layer is separated and the aqueous layer extracted with 200 ml. of benzene. The organic layers are combined and washed twice with 100 ml. solution of 10% sodium hydroxide. The mixture is then distilled through a column to yield o-methoxyphenyl allyl ether in about 56% yield. The compound has a pungent phenolic odor useful in the perfume industry.

The compounds of the present invention as indicated can be used in a wide variety of perfume or perfume-like compositions. As are illustrated, they can be used in soap compositions and remain stable without objectionable discoloration or detraction. Thus for example:

EXAMPLE VI

Approximately 20 grams of unperfumed standard #1 soap stock and 0.2 gram of the formula of Example II wherein one-half of the bergamot is replaced with beta-methallyl p-methoxyphenyl ether is placed in a mortar and milled until the soap is reduced to a fine powder. About two ml. of distilled water is then added and the mixture milled again to produce a plastic mass. The soap thus prepared is put into a tabletting die and pressed in a hand arbor to produce a square cake. The cake had the freshness of a cologne which remained over an extended period.

While the compounds of the present invention have a definite composition and configuration, it will be apparent from the foregoing description that methods of production and use can be varied considerably and that they can be employed in various compounded and blended combinations. In view thereof, it should be understood that the examples cited above are intended to be illustrative only and are not intended to limit the scope of the invention.

I claim:
1. Perfume and perfume-containing compositions containing an effective amount of a compound selected from the group consisting of beta-methallyl p-methoxyphenyl ether, beta-methallyl o-methoxyphenyl ether, p-methoxyphenyl allyl ether and o-methoxyphenyl allyl ether.
2. A perfume composition containing a mixture of bergamot oil and beta-methallyl p-methoxyphenyl ether.

References Cited
UNITED STATES PATENTS
2,598,049  5/1952  Gleim _____ 260—613

ALBERT T. MEYERS, *Primary Examiner.*

JEROME D. GOLDBERG, *Assistant Examiner.*